(No Model.) 6 Sheets—Sheet 5.
R. EICKEMEYER.
DYNAMO ELECTRIC MACHINE.
No. 534,953. Patented Feb. 26, 1895.
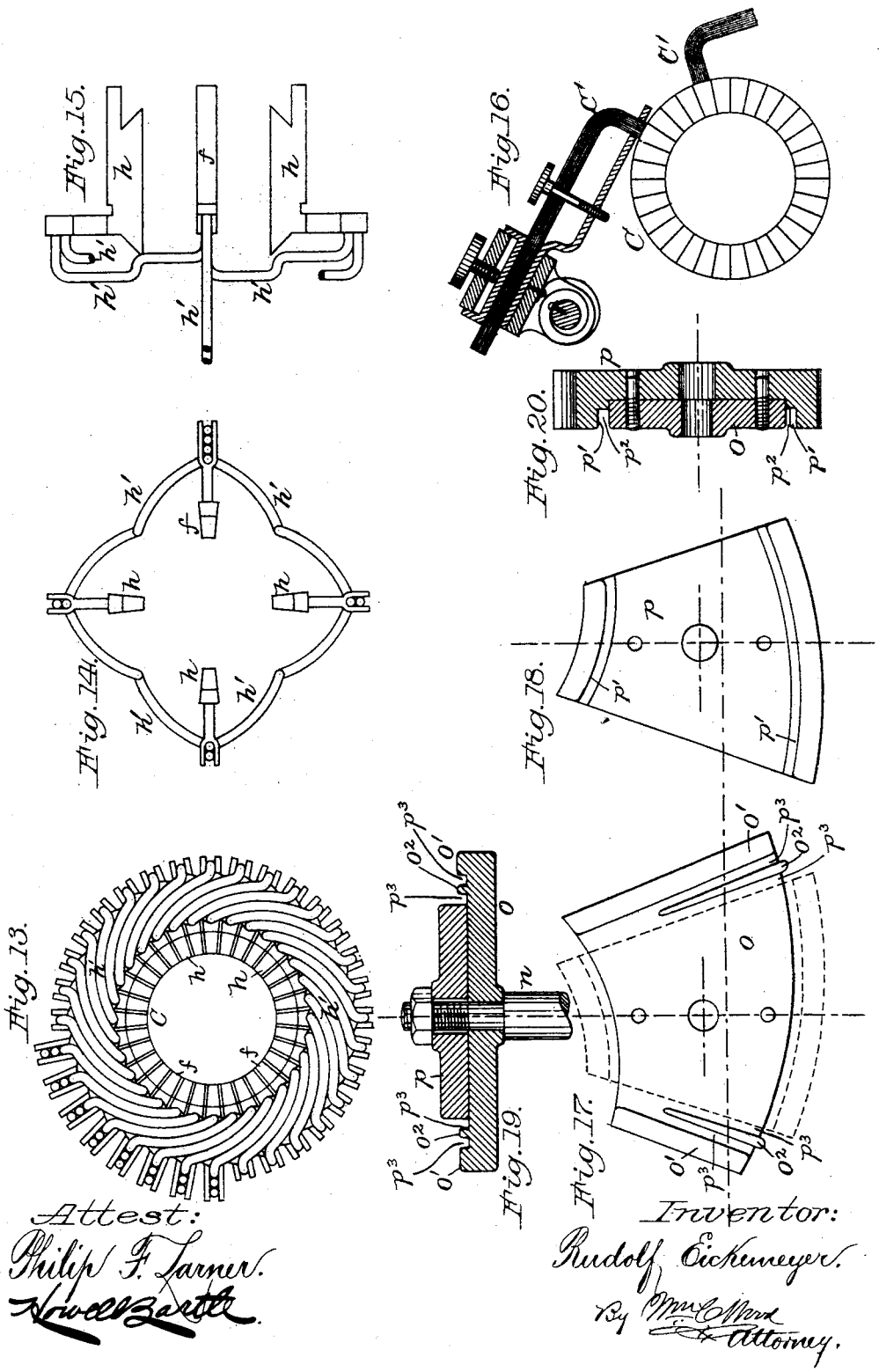
Attest:
Philip F. Larner.
Howell Barth.
Inventor:
Rudolf Eickemeyer.
By his Attorney.

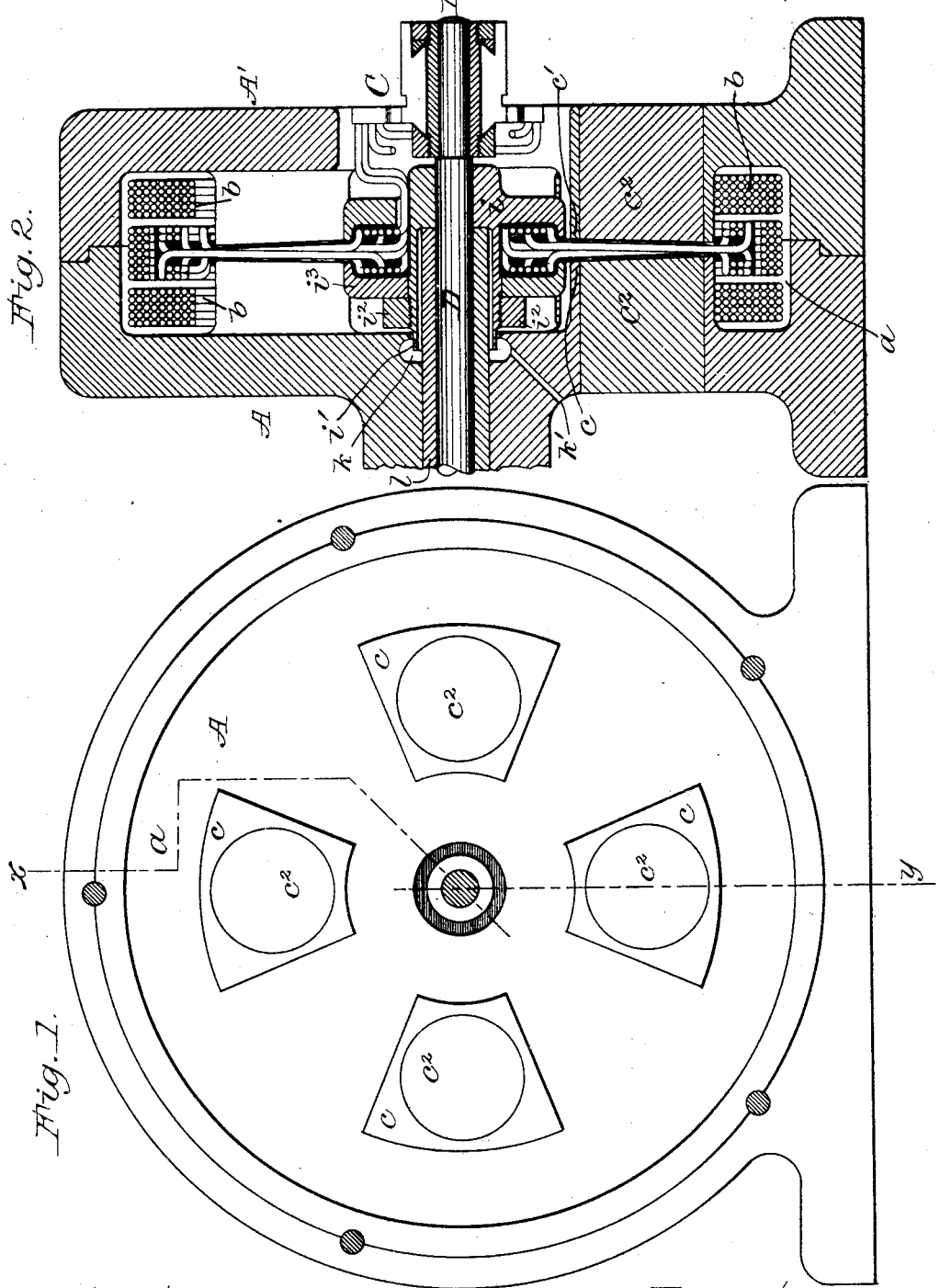

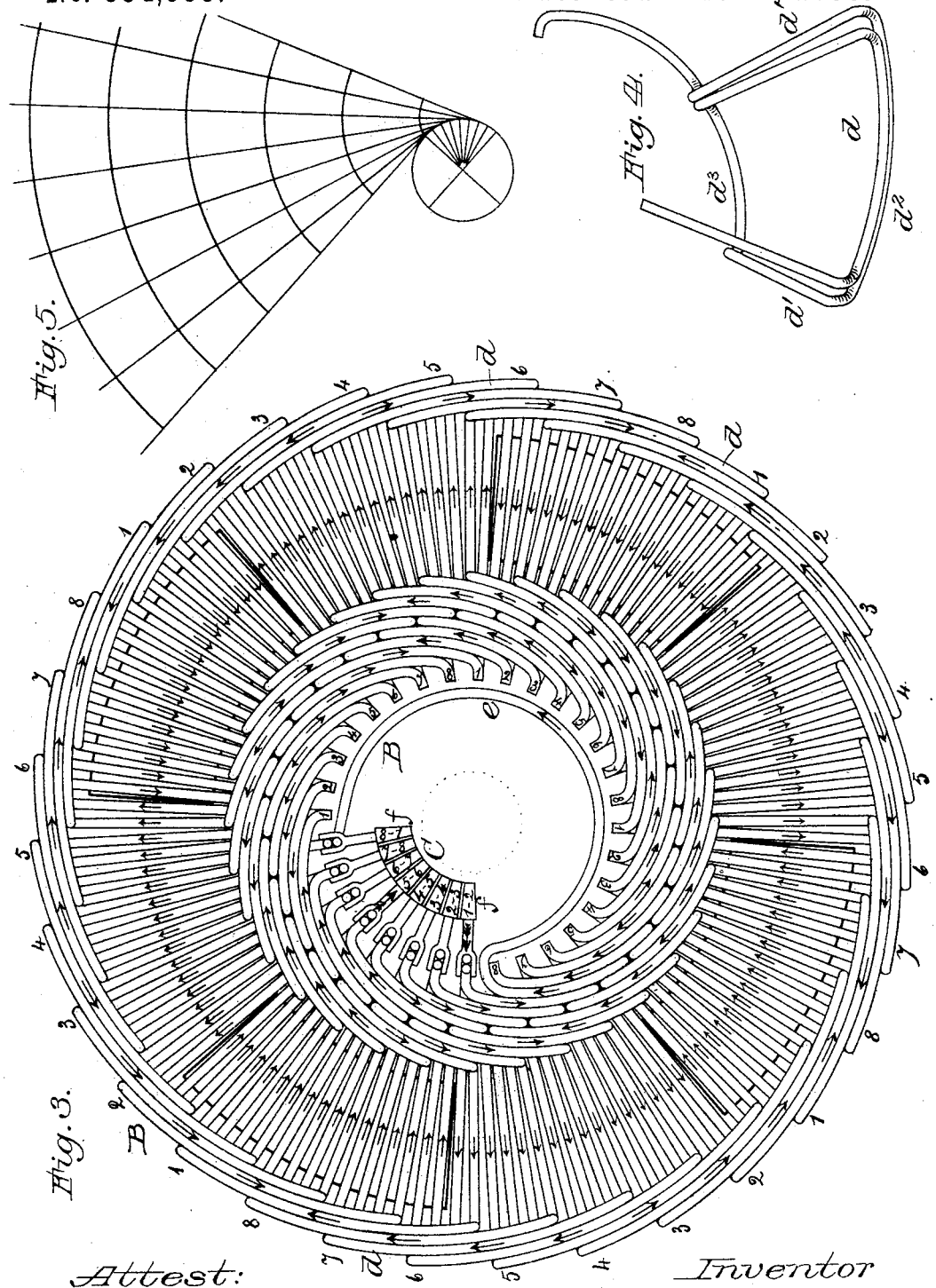

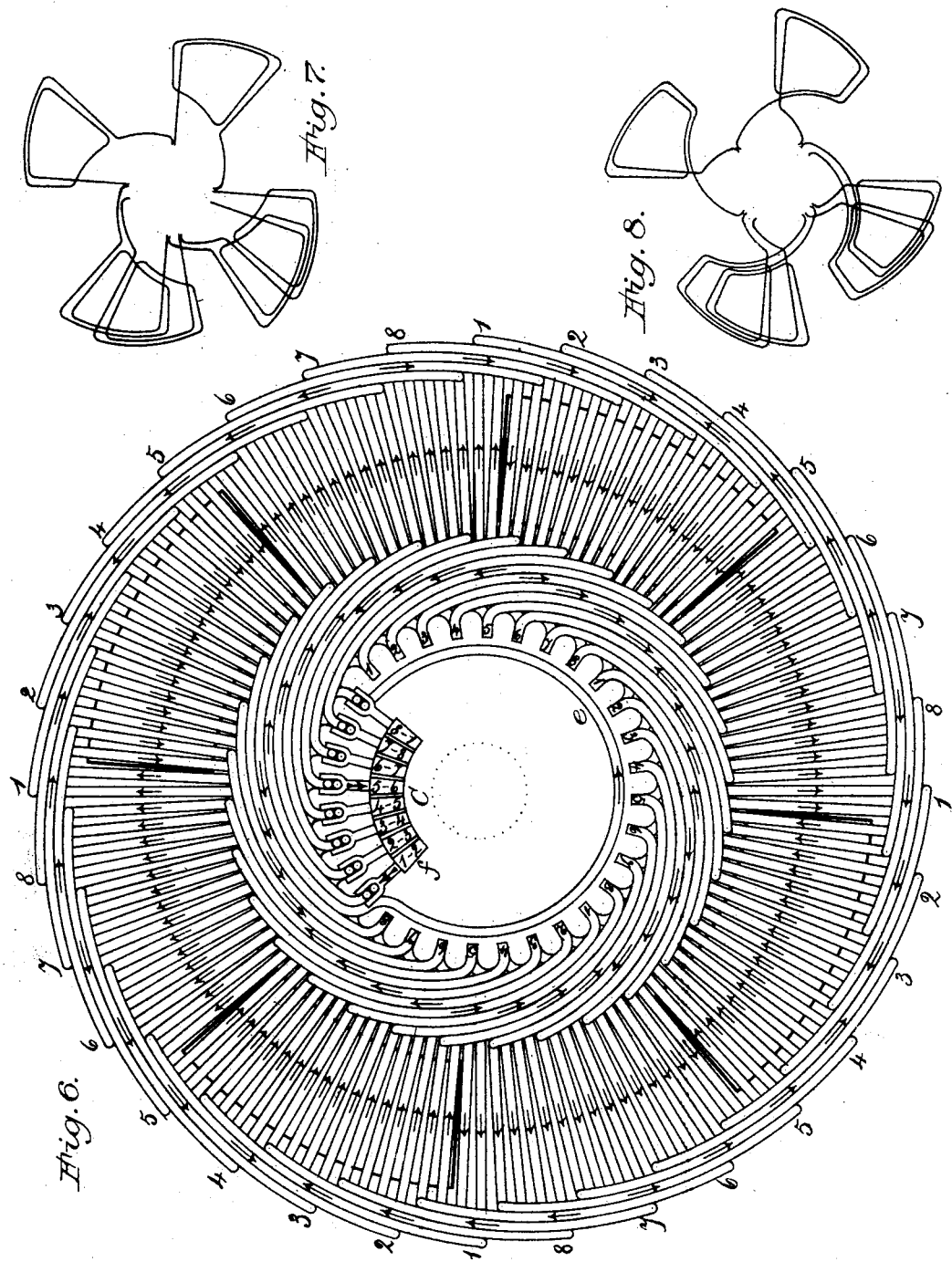

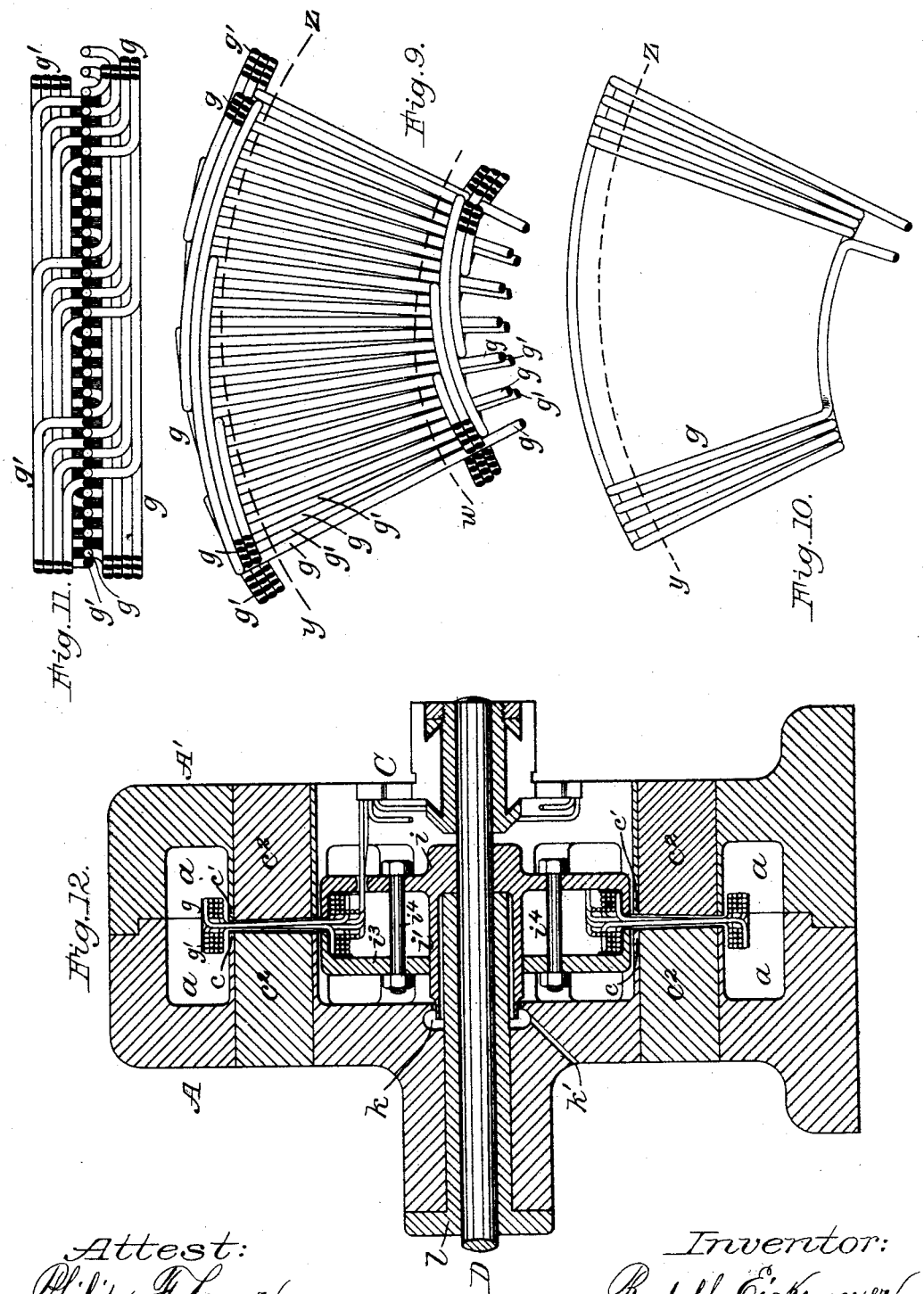

(No Model.) 6 Sheets—Sheet 6.
R. EICKEMEYER.
DYNAMO ELECTRIC MACHINE.
No. 534,953. Patented Feb. 26, 1895.
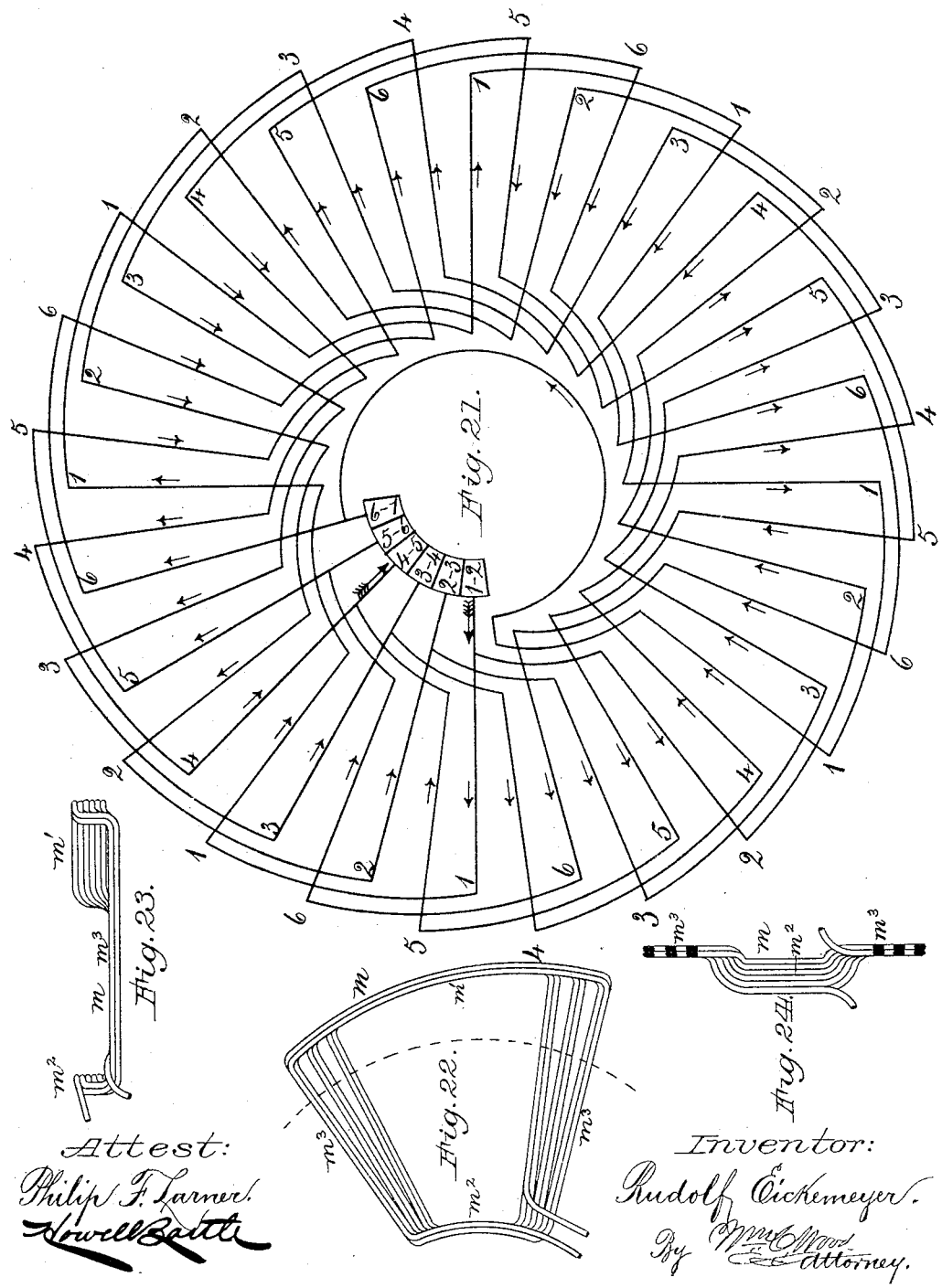

UNITED STATES PATENT OFFICE.

RUDOLF EICKEMEYER, OF YONKERS, NEW YORK.

DYNAMO-ELECTRIC MACHINE.

SPECIFICATION forming part of Letters Patent No. 534,953, dated February 26, 1895.

Application filed June 7, 1888. Serial No. 276,318. (No model.)

*To all whom it may concern:*

Be it known that I, RUDOLF EICKEMEYER, of Yonkers, in the county of Westchester and State of New York, have invented certain new and useful Improvements in Dynamo-Electric Machines; and I do hereby declare that the following specification, taken in connection with the drawings furnished and forming a part of the same, is a clear, true, and complete description of the several features of my invention.

My present improvements relate mainly to that general class of machines, in which disk armatures are employed as distinguished from those having drum armatures, and ring armatures.

The main features of my present invention, include certain radical improvements in coils or windings for disk armatures, in the development of which I have followed and been guided by, the general principles involved in the drum armature coils or windings devised by me and disclosed in my Letters Patent, dated February 14, 1888, No. 377,996.

I have now for the first time in this art, devised and constructed disk armature coils or windings, each consisting of one, or of any desired number of convolutions of wire, bent into a substantially segmental form, and having two sides which occupy substantially radial lines, and also having outer and inner ends which are offset laterally, their form being such, that a set or series of these coils, all counterparts, and each complete and detachable, may be assembled and arranged in circular or disk form, with all of their sides in position, to serve as radial conducting portions, and having the outer and inner offset ends of each coil, overlapped or underlapped by the adjacent ends of other coils, in a manner similar in this respect, to the arrangement of shingles as ordinarily applied in shingling a roof. In their best form, the outer and inner offset ends of said coils, are bent longitudinally in involute lines, so that the several coils of a set, may be snugly and symmetrically arranged.

In a simple form of disk, a single set or annular series of my coils may be employed, but more effective results will accrue by the employment of my novel coils or windings, in two annular sets, each of which is in a complete disk form, but these are placed together back to back, so that the radial sides of the coils in one set, alternate with the whole or a part of the radial sides of the coils of the other set, but preferably so that near the periphery of the disk, the sides of the coils in both sets, occupy a common plane substantially at right angles to the axis of the disk, while at their inner portions, the sides of the coils in the two sets, are slightly inclined each side of said plane. In other words, in a disk armature having two disks, each composed of my novel coils, and combined as described, for producing the best results, the radial portions of all the coils, near their outer ends, occupy one plane, while near their inner ends, the radial portions of the coils in one set, occupy one slightly inclined plane, and the corresponding radial portions of the other set occupy another similar plane, inclined with reference to the axis of the armature. This arrangement of the radial portions of said coils, is not only of advantage electrically, but it results in a compact, strong, and reliable armature which can be revolved at high speed with perfect safety to the structure. I have also devised a mode of coupling my novel coils in series, so that all of the coils are electrically connected directly to say one-quarter of the bars of a commutator, as in a four pole machine, and these bars are so connected to the rest of the bars as to afford proper terminals at one side of the commutator, and within one eighth of its periphery.

With the view of attaining high efficiency and reducing magnetic resistance, in machines of this class, I have now devised a novel construction of such electro magnets as were devised by me and disclosed in my Letters Patent No. 351,906, dated November 2, 1886. Said electro magnets for disk machines, as heretofore constructed by me, consisted of a shell or casing composed of cast iron sections, each having a series of annularly arranged pole faces, each of these being integral with one side or the other of the shell or casing, and exciting helices were housed within the shell, concentric with said pole faces. The magnetic value of cast iron being much less than that of soft wrought iron, I have now introduced wrought iron, and devised an economical way of combining both kinds of iron, and I have thereby greatly increased the efficiency of the machines, by lessening that resistance to the magnetic currents which results from the use of cast iron alone. In other words, I still use cast iron for all portions of the casing, except at the pole faces, these latter being cylindrical blocks of soft wrought iron, snugly fitted into holes in the casing, and in their best form my novel casings have pole faces which are in part composed of cast iron integral with the casing, as in my prior machines, and in part composed of plugs or cylinders of wrought metal each snugly fitted into a hole centrally located in a cast metal pole face. Certain special features of construction have also been devised by me, for mounting the disk on its shaft and preventing the entrance of oil from the shaft bearings into the machine, or toward the commutator.

To more particularly describe my invention, I will refer to the accompanying six sheets of drawings, in which—

Figure 1, Sheet 1, is an interior view of one of the sections of a shell or casing embodying my improved pole faces. Fig. 2 is a central section of the entire casing on the line $x$, $y$, Fig. 1, and it also illustrates one of my novel disk armatures in diametrical section, its commutator, the exciting helices, and other portions of the machine. Fig. 3, Sheet 2, is a side view of one of the simple forms of my novel disk armature. Fig. 4, in side view, illustrates one of the novel coils of Fig. 3, detached. Fig. 5 is a diagram illustrating the involute curve best suited for the inner and outer ends of my coils. Fig. 6, Sheet 3, in side view illustrates one of my novel disk armatures, with the several coils, coupled together in a manner slightly unlike that shown in Fig. 3. Fig. 7 is a diagram illustrating the coupling of the coils as in Fig. 3. Fig. 8 is a similar diagram illustrating the coupling of the coils as in Fig. 6. Fig. 9, Sheet 4, in side view, illustrates a detached group of coils and parts of coils, constituting a segmental portion of one of my novel disk armatures in its best form. Fig. 10, in side view, illustrates one of the coils of Fig. 9, detached from the armature. Fig. 11, is a sectional view of the group of coils, Fig. 9, on line $y$, $z$, and looking toward the rim of the armature. Fig. 12 is a vertical sectional view of one of my present machines without its exciting helices, and illustrating a construction of the armature hub, unlike that shown in Fig. 2. Fig. 13, Sheet 5, is an end view of the commutator, illustrating the connection of the bars thereof which are directly coupled to the coils, with the other bars of the commutator. Fig. 14 illustrates in end view, four of said commutator bars detached, and also the conductors by which a group of three of them are connected with the bar which is directly coupled with the armature coils. Fig. 15, in side view, illustrates the bars and conductor of Fig. 14. Fig. 16, in end view, illustrates the commutator, and the location of the brushes thereon, but it is to be understood that any form of brush may be used without departure from my invention, and that ordinary plate brushes are preferred to the particular form here shown. Figs. 17, 18, 19 and 20, illustrate a winding frame devised by me for conveniently and economically producing my novel coils. Fig. 21, Sheet 6, is a diagram illustrating a desirable mode of connecting my coils in one series, each coil here indicated having but one convolution. Figs. 22, 23 and 24, respectively in side, edge and sectional views illustrate one of my novel coils having twelve convolutions of wire.

I will first describe the novel feature in my electro magnet, and for this purpose will refer to Figs. 1, 2 and 12, wherein the sections A, A', of the shell or casing, are composed of cast iron, of such form as to afford the interior annular recess or space $a$, for the exciting helices $b$, and ample space for the disk armature. These casings are for four pole machines, and both sections have pole faces $c$, $c'$, integral with the casing, and separated by a space occupied by the radial portions or spokes of the armature. My present improvement in this connection, consists in combining with said cast iron casing, soft wrought iron pole faces $c^2$, which are snugly fitted to holes in the casing. These wrought iron pole faces can be most cheaply constructed and applied, when they are cylindrical in form as shown, thus enabling the holes therefor to be partially provided for in the casting of the iron casing, and involving only the simplest lathework and boring to secure good magnetic contacts, and while fairly good results will accrue if the entire pole face be thus inserted, a more extensive magnetic contact of the wrought and cast metal is secured by having each pole face partially of cast iron, so as to more fully embrace the wrought metal plugs or cylinders, and giving to the cast metal portion, the key stone form or segmental outline specially desirable in this class of machines.

It is to be understood that the form of the casing and the arrangement of the exciting helices and pole faces can be indefinitely varied without in any manner affecting those portions of my invention which relate to the disk armature and its coils.

I will now describe the disk armature B of Fig. 3, which is composed of a single set of my novel coils, each having two convolutions. One of these coils $d$ is shown detached in Fig. 4, it being composed of insulated wire, bent into what may be termed a segmental form, in that it has two radial sides $d'$, an outer curved end $d^2$, and an inner curved end $d^3$, although the lines of curve at the two ends differ somewhat, and one side is longer than the other. The bends of the wire can be readily followed by commencing from the radial terminal shown, thence to the outer end, where it is offset laterally, and then it is bent longitudinally on the curve shown at said outer end, then bent back from said offset, thence laid radially to the inner end, there offset and carried on a curve at the inner end, back of the radial terminal, and beyond it, thence into the plane of said terminal, and nearly parallel therewith to the outer end, then offset and along the curved outer end parallel with the wire in the first convolution, thence back into the same plane as the three radial portions already formed, and thence nearly parallel therewith to the inner end, and there it is again offset, and bent to the one side to form the curved terminal shown. The most desirable curves for these inner and outer ends are in involute lines, determined as by the diagram Fig. 5, according to the number of wires employed. There are thirty-two coils in the armature Fig. 3, and hence the circle from which said involute lines are developed, has a circumference equal to the aggregate diameter of thirty-two wires. In said armature the radial and curved terminals of the coils are coupled together, as illustrated in Fig. 3, and more graphically in Fig. 7.

It will be seen that several coils like that shown in Fig. 4, may be grouped together, so that all their radial sides will occupy one plane, substantially at right angles to the axis of an armature, and that the laterally offset inner and outer ends of each coil will be overlapped and underlapped by portions of the ends of other coils, as is clearly indicated in Fig. 3, wherein there are thirty-two of said coils which, as this set is for duty as a four pole armature, the coils are numbered in groups from 1 to 8 sequentially, and the positions of the four pole faces are clearly indicated. Opposite the pole faces the current is inward on each coincident radial portion of the coils, and outward in such radial portions as are not opposite the pole faces, as indicated by the radial arrows, and in the inner and outer curved ends of the coils, the direction of the current varies, as is indicated by arrows thereon, according to the varying direction of the current in the radial portions of the coils.

Although my novel coils may be coupled to the commutator in various ways according to the character of current desired without departure from certain portions of my invention, I have here shown said coils connected to the commutator C, so as to develop a continuous current. It will be seen that all of the coils but two are directly coupled at their radial terminals with the curved terminals of other coils, and that one of the coils No. 8, has its radial terminal, coupled to the curved terminal of one of the No. 1 coils, by an annularly bent conductor $e$, and that both of these are coupled to the one of the eight commutator bars $f$ which is marked 8—1. The other seven commutator bars $f$, are respectively coupled to coils 7—8, 6—7, 5—6, 4—5, 3—4, 2—3, and 1—2, as clearly shown, so that the bars $f$ 1—2 and $f$ 5—6, constitute the brush contacts or terminals of the series, as clearly indicated by the feathered arrows. These brush contact bars are separated by two bars as illustrated in Fig. 16 only, and these four bars constitute one-eighth of the circumference of the commutator C in a four pole machine. As hereinbefore indicated the brush C' may be of any of the many well known kinds without in any manner affecting my invention. This mode of coupling the coils to the commutator is more clearly illustrated in Fig. 21, wherein twenty-four coils of one convolution each are shown, and these are in four groups, the coils of each numbered from 1 to 6, and all are coupled to six commutator bars, affording terminals at bars marked 1—2 and 4—5, as shown at the feathered arrows, the currents in the radial portions of the coils being also appropriately indicated by arrows in each case. These novel coils can have any desired number of convolutions, the coil $g$ shown in Fig. 10, having four convolutions, but this like that already described, has radial sides, or bars of gradually varied lengths, and curved inner and outer ends, which are laterally offset, the radial portions occupying one plane, and the portions of the wire at the offset ends lying side by side, and projecting laterally. In this coil, the radial portions of the wire near the inner end, are in close contact with each other, but they are gradually separated, so that near the outer ends, an intervening space is afforded between each two convolutions for the reception of corresponding radial portions of other similar coils when placed back to back, as illustrated in Figs. 9, 11, 2 and 12. One set of coils $g$, annularly arranged as described, constitutes one half of the disk, and a second set of coils $g'$ similarly arranged is pressed against the first closely back to back, and with the radial portions of the coils $g$, alternating with the radial portions of the coils $g'$, as clearly indicated in Fig. 9. In Fig. 11, a portion of the disk thus formed, is shown in section on line $y$, $z$, Fig. 9, looking toward the rim, or outer ends of the coils, the central row of white circles indicating in section the radial portions of coils $g$ and the alternating black circles indicating in section, the radial portions of the coils $g'$. It will be seen that on line $w$ of Fig. 9, the radial portions of each set of coils, occupy slightly inclined planes peculiar to each set, whereas on line $y$—$z$, the radial portions of both sets, occupy a plane common to all, and this feature is more clearly shown in Figs. 2 and 12. The coils of the two sets are appropriately coupled together, and then to the proper commutator bars, as already described.

I will now refer to Fig. 6, and state that I therein illustrate coils, and their connections with each other, and with the proper commutator bars, which differ from those in Fig. 3, only in that each coil has two curved terminals, as shown in Fig. 8, instead of each having one curved and one radial terminal, as shown in Fig. 7.

It will be obvious that my novel coils may be coupled to commutator bars in any of the well known arrangements common with ordinary windings, but when directly coupled to one quarter of the bars as shown, these bars *f* are in turn so coupled to the other bars *h* of the commutator C, as to secure fixed terminal points during the rotation of the disk and commutator. Each of the directly coupled bars is connected with the three other bars *h*, which occupy appropriate positions, as illustrated in Figs. 14 and 15, by means of conductors *h'*, which are so curved and centrally offset, that each may in part underlie and in part overlie, others adjacent thereto, and be closely and symmetrically laid at the inner end of the commutator, as clearly illustrated in Fig. 13.

The mode of mounting the wire disk, whether of the single or double form upon the shaft D, may be widely varied, as for instance in Fig. 2, I illustrate a fixed plate or collar *i* having a hub securely fixed to the shaft at its end, and having holes through which the terminals of the coils are passed to the commutator, and also having a sleeve *i'*, which loosely surrounds a bushing or sleeve bearing for the shaft. The end of said sleeve is externally screw threaded for receiving a clamp nut $i^2$ between which and the fixed plate or collar *i* there is a corresponding but movable collar $i^3$, these clamping collars being recessed at their inner or coincident sides to afford space for the inner ends of the disk coils, but at the same time they clamp and confine said coils firmly in position upon the shaft. In Fig. 12, similar fixed and movable plates or collars *i* and $i^3$, are shown, but these are clamped together by the bolts $i^4$. In each instance the annular end of the sleeve *i'* occupies an annular recess *k* in the casing from which an exit duct *k'* leads downwardly, thus rendering it practically impossible for lubricating oil to find its way into the interior of the machine or toward the commutator C. It will be seen that the bearing sleeve or bushing *l* extends beyond the center of the armature, thus securing a firm, steady support for the armature when running at high speed, and the commutator is practically isolated from lubricated portions of the machine.

I have already stated that the number of convolutions of wire in my novel coils may be indefinitely varied, but those already described, have in each instance a single row of radial wire, and this is desirable when coarse or heavy wire is employed. In Figs. 22, 23 and 24, I show one of the many fine wire coils made by me in accordance with my present invention. This coil *m* has the same offset outer and inner ends *m'*, $m^2$, but it has twelve convolutions of wire, its radial portion consisting of what may be called six spokes $m^3$, each of which contains four portions of the wire, as clearly indicated in Fig. 24.

Coils with a still greater number of convolutions, and a greater number of "spokes" could be illustrated, but it is believed that those shown will be ample for the purposes of this specification.

My novel coils can be wound or formed in a variety of ways, without in any manner departing from my invention, it being immaterial by what method or process the wire is put into the form described, but I have devised a frame or complex forming block, by means of which the coiling or winding of the wire may be conveniently and economically performed; and this I have shown in Figs. 17, 18, 19 and 20. In this frame or block there is an axis *n*, on which is mounted a base *o*, having on its top surface ribs *o'* and $o^2$, arranged with reference to each other, on lines corresponding with the radial lines desired in a coil. On top of this base, there is a pattern block *p*, of a segmental form and having surfaces at *p'*, in curved lines which correspond with the inner and outer curved ends of the coils desired. When said base and pattern block are bolted together as shown in Fig. 20, curved grooves $p^2$, are afforded, within which the wire at the curved ends of the coil is laid, and as indicated in Figs. 17 and 19, straight grooves $p^3$, are afforded in which the radial portions of the coils are laid.

It will be readily seen that by commencing for instance at the inner or concave edge of the frame, the wire may be laid in one of the grooves $p^3$, thence out and along the outer curved groove $p^2$, thence back by another groove $p^3$, corresponding with the first one occupied, thence along the inner groove $p^2$, and so on until the coil is completed, if the radial portions are to be of single wire, but if several portions of the wire are to be grouped in one "spoke," then the proper number of convolutions are laid in each two of the grooves $p^3$, before laying the wire in the other straight grooves. This frame can be used to form coils having sides embodying two, or four radial portions of coarse wire, or each of the radial portions may be composed of two or more lengths of wire or convolution, but similar frames with six or with eight grooves $p^3$ are used for producing respectively, the coil Fig. 22, and that shown in Fig. 10, the frame being varied in construction according to the particular coils desired.

The parts of the frame are readily separated and put together, and it embodies certain features of invention disclosed in my Letters Patent No. 377,997, dated February 14, 1888.

Having thus described my invention, I claim as new and desire to secure by Letters Patent—

1. A disk armature coil or winding for dynamo electric machines, consisting of one or more convolutions of wire bent into a substantially segmental form, and having sides which occupy substantially radial lines, and also having outer and inner ends which are offset laterally substantially as described, whereby a series of such coils, all alike and each complete and detachable, may be arranged in circular form with all of their sides in position to serve for radial electric conduction, and with the offset ends of each coil overlapped or underlapped by the adjacent ends of other coils.

2. In a disk armature for dynamo electric machines, the combination of a series of annularly arranged counterpart coils, each having a segmental form, sides which are radial to the axis of the armature, and outer and inner ends which are offset laterally, substantially as described.

3. In a disk armature for dynamo electric machines, the combination substantially as hereinbefore described, of a set or series of segmental counterpart coils, annularly arranged, and a second set of similar coils, the coils of both sets having radial sides or portions, and having the radial portions of the coils of one set, alternating with the radial portions of the other set.

4. In a disk armature for dynamo electric machines, the combination substantially as hereinbefore described, of counterpart coils having radial sides annularly arranged in two sets placed back to back, with the radial portions of the coils of one set, alternating with the radial portions of the coils of the other set, and also having said radial portions of both sets in a plane common to all of the coils, near the periphery of the disk, but in two separate slightly inclined planes near the hub of the armature.

5. In a disk armature for dynamo electric machines, the combination of annularly arranged counterpart coils, each having radial sides and offset inner and outer ends, and clamping plates or collars, between which all of said coils are clamped at their inner ends, and firmly maintained in the form of a disk, substantially as described.

6. In a disk armature for dynamo electric machines, the combination of a set of counterpart coils, annularly arranged, electrically connected together, and directly connected to a limited number of commutator bars, and other commutator bars which are electrically connected in groups to those bars with which said coils are directly connected, substantially as described.

7. In a commutator, the combination of a series of bars with which armature coils or windings are directly connected, and other bars which are connected in groups, with said directly connected bars, by means of wires which are centrally offset, and curved in different planes, substantially as described.

8. In a dynamo electric machine, the combination with a cast iron shell or casing, inclosing one or more exciting helices, of masses of wrought iron tightly mounted in holes in said casing, and affording pole faces, substantially as described.

9. In a multipolar dynamo electric machine, a cast iron casing inclosing one or more exciting helices, and having a series of inwardly projecting pole faces integral with said casing, and wrought iron plugs or cylinders tightly fitting holes in said casing at the center of each integral pole face, substantially as described.

10. The combination of the armature shaft, the fixed collar or plate, secured to the end of said shaft and having an annular sleeve inclosing said shaft and a portion of its bearing, and the casing having an annular recess, occupied by the end of said sleeve, and provided with a duct for the outward discharge of oil, substantially as described.

RUDOLF EICKEMEYER.

Witnesses:
JAMES S. FITCH,
L. A. CHASE.